United States Patent
Hindle et al.

(10) Patent No.: US 10,506,263 B2
(45) Date of Patent: Dec. 10, 2019

(54) EXTENDING DATA RECORDS BASED ON DEVICE CLASSES

(71) Applicant: Comcast Cable Communications Management, LLC, Philadelphia, PA (US)

(72) Inventors: James Hindle, London (CA); Peter G. N. Scheyen, London (CA); Mark A. Vickers, Belmont, CA (US)

(73) Assignee: Comcast Cable Communications Management, LLC, Philadelphia, PA (US)

(*) Notice: Subject to any disclaimer, the term of this patent is extended or adjusted under 35 U.S.C. 154(b) by 557 days.

(21) Appl. No.: 14/325,464

(22) Filed: Jul. 8, 2014

(65) Prior Publication Data
US 2015/0074731 A1    Mar. 12, 2015

Related U.S. Application Data

(63) Continuation of application No. 13/019,532, filed on Feb. 2, 2011, now Pat. No. 8,788,534, which is a continuation of application No. 11/038,298, filed on Jan. 19, 2005, now Pat. No. 7,908,295.

(60) Provisional application No. 60/564,703, filed on Apr. 23, 2004.

(51) Int. Cl.
| | |
|---|---|
| *H04N 21/23* | (2011.01) |
| *H04N 21/235* | (2011.01) |
| *H04N 21/262* | (2011.01) |
| *H04N 21/435* | (2011.01) |
| *H04N 21/478* | (2011.01) |
| *H04N 21/482* | (2011.01) |
| *H04N 21/84* | (2011.01) |

(52) U.S. Cl.
CPC ....... *H04N 21/235* (2013.01); *H04N 21/2358* (2013.01); *H04N 21/26283* (2013.01); *H04N 21/435* (2013.01); *H04N 21/478* (2013.01); *H04N 21/4821* (2013.01); *H04N 21/4828* (2013.01); *H04N 21/84* (2013.01)

(58) Field of Classification Search
CPC .................................................. H04N 21/235
USPC ............... 707/706, 713, 722, 736, 758, 781, 707/791–793, 798–802, 822, 828; 725/132, 139, 115, 135, 90; 709/250; 715/717, 760, 762; 348/569, 563, 564
See application file for complete search history.

(56) References Cited

U.S. PATENT DOCUMENTS

| | | |
|---|---|---|
| 5,578,056 A | 11/1996 | Pauldrach |
| 5,579,055 A | 11/1996 | Hamilton et al. |
| 5,638,112 A | 6/1997 | Bestler et al. |
| 5,751,282 A | 5/1998 | Girard et al. |
| 5,808,694 A | 9/1998 | Usui et al. |
| 5,924,091 A | 7/1999 | Burkhard |
| 5,924,093 A | 7/1999 | Potter et al. |
| 6,075,570 A | 6/2000 | Usui et al. |

(Continued)

OTHER PUBLICATIONS

Office action in related Canadian application 2,505,220 dated Oct. 27, 2011.

(Continued)

*Primary Examiner* — Syling Yen
(74) *Attorney, Agent, or Firm* — Banner & Witcoff, Ltd.

(57) ABSTRACT

A system, method and data structure for processing basic client application data types to add thereto extension types and priority levels adapted for use by each of a plurality of set top box classes.

23 Claims, 5 Drawing Sheets

(56) References Cited

U.S. PATENT DOCUMENTS

| | | | |
|---|---|---|---|
| 6,154,206 | A | 11/2000 | Ludtke |
| 6,539,374 | B2 | 3/2003 | Jung |
| 7,075,899 | B2* | 7/2006 | Sheehan ............ H04N 21/2362 348/729 |
| 7,162,697 | B2 | 1/2007 | Markel |
| 8,075,570 | B2 | 12/2011 | Bolduc et al. |
| 2001/0010754 | A1 | 8/2001 | Ando et al. |
| 2001/0010854 | A1 | 8/2001 | Hillier |
| 2002/0042913 | A1 | 4/2002 | Ellis et al. |
| 2002/0088008 | A1 | 7/2002 | Markel |
| 2002/0147986 | A1 | 10/2002 | Michael et al. |
| 2002/0168178 | A1 | 11/2002 | Rodriguez et al. |
| 2002/0188944 | A1 | 12/2002 | Noble |
| 2002/0191956 | A1 | 12/2002 | Morishima et al. |
| 2002/0194597 | A1 | 12/2002 | Barrett |
| 2002/0196597 | A1 | 12/2002 | Volfkovich et al. |
| 2003/0009769 | A1* | 1/2003 | Hensgen ................ G06F 9/52 725/131 |
| 2003/0041104 | A1* | 2/2003 | Wingard ............ H04N 5/44543 709/203 |
| 2003/0088876 | A1 | 5/2003 | Mao et al. |
| 2003/0088878 | A1 | 5/2003 | Rogers et al. |
| 2003/0110514 | A1 | 6/2003 | West et al. |
| 2003/0212703 | A1 | 11/2003 | Yoshioka |
| 2003/0229900 | A1* | 12/2003 | Reisman ........... G06F 17/30873 725/87 |
| 2003/0233663 | A1 | 12/2003 | Rao et al. |
| 2004/0004977 | A1 | 1/2004 | Robbins et al. |
| 2004/0010628 | A1 | 1/2004 | Gillam et al. |
| 2004/0060063 | A1 | 3/2004 | Russ et al. |
| 2004/0078814 | A1 | 4/2004 | Allen |
| 2004/0088876 | A1 | 5/2004 | Genal et al. |
| 2004/0220858 | A1 | 11/2004 | Maggio |
| 2004/0226051 | A1 | 11/2004 | Carney et al. |
| 2005/0141519 | A1 | 6/2005 | Rajgopal et al. |
| 2005/0278741 | A1 | 12/2005 | Robarts et al. |
| 2007/0240186 | A1 | 10/2007 | Silver et al. |

OTHER PUBLICATIONS

Wang et al., "Jato: A Compact Binary File Format for Java Classes", Eighth International Conference on Parallel and Distributed Systems (ICPADS'01 ). pp. 467, 2001, ISBN 0-7695-1153-8.

Donald E. Knuth, "The Art of Computer Programming vol. 3", Sections 6.4 and 6.5, pp. 513-579, ISBN0-201-89685-8.

Cormen, Leiserson and Rivest, "Introduction to Algorithms", Chapter 12, pp. 219-239, ISBN0-262-03141-8 and 0-07-013143-0.

* cited by examiner

EXTENDING DATA RECORDS BASED ON DEVICE CLASSES

CROSS-REFERENCE TO RELATED APPLICATIONS

This application is a continuation of co-pending U.S. application Ser. No. 13/019,532, filed Feb. 2, 2011, entitled "EXTENDING DATA RECORDS FOR DYNAMIC DATA AND SELECTIVE ACCEPTANCE BASED ON HARDWARE PROFILE," which is a continuation of U.S. application Ser. No. 11/038,298, filed Jan. 19, 2005 (now U.S. Pat. No. 7,980,295, issued Mar. 15, 2011), entitled "EXTENDING DATA RECORDS FOR DYNAMIC DATA AND SELECTIVE ACCEPTANCE BASED ON HARDWARE PROFILE," which claims the benefit of priority from U.S. provisional application Ser. No. 60/564,703, filed Apr. 23, 2004, and entitled "COMPACT, MEMORY-MAPPED DATABASE WIRE FORMAT." Each of the above noted applications are hereby incorporated by reference in its entirety.

BACKGROUND

1. Field

The present invention relates to information delivery systems and, more particularly, to efficiently providing information to clients such as set top boxes (STBs) having differing capabilities.

2. Description of the Related Art

There is a wide variance in the hardware capabilities of set top boxes (STBs) coexisting on a single radio frequency (RF) network, such as a cable television or satellite television distribution system. All of these STBs typically require the basic data normally associated with, for example, an interactive program guide (IPG) application operating within a middleware environment such that provided by Liberate Technologies, Inc., of San Mateo, Calif. The basic data includes several descriptor fields for each program, such as program title, rating, description, showing times and the like. This commonality of basic data leads to a database design geared towards the lowest common denominator of boxes. Such a database design, while useful in serving a group of STBs or other clients, is far from optimal in serving at least the higher capability STBs or other clients.

SUMMARY

Various deficiencies of the prior art are addressed by the present invention of a system, method and data structure for processing basic client application data types to add thereto extension types and priority levels adapted for use by each of a plurality of set top box classes. The extension types define extended data associated with a basic data type, while the priority levels define the minimum class level (i.e., capability level) of a STB able to use that extension type.

In a set top box, a method according to an embodiment of the invention comprises receiving the basic data needed to implement an application (such as an interactive program guide application), comparing the class of the set top box to the extension types for the basic data received and, if appropriate, receiving the extension data for the basic data. Furthermore, an application programming interface (API) may allow an application to request the basic or extended data regardless of STB class, since the request will be denied of the STB is not of a sufficiently high class.

A method according to an embodiment of the present invention comprises: receiving, at a client device, basic data associated with an application; comparing a class of the client device to extension types for the received basic data; and if the client device class is sufficient for the extension type, receiving extended data associated with the received the basic data.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention will be generally described within the context of an information distribution system that propagates content (e.g., movies, sports and the like), various services (e.g., video on demand, Interactive Program Guide and the like) and applications (e.g., billing and other services) to clients or set top boxes associated with users. It will be appreciated by those skilled in the art that while the invention has specific utility within the context of the systems described herein, the invention has broad applicability to any system supporting client devices of varying capability.

Figure 1:
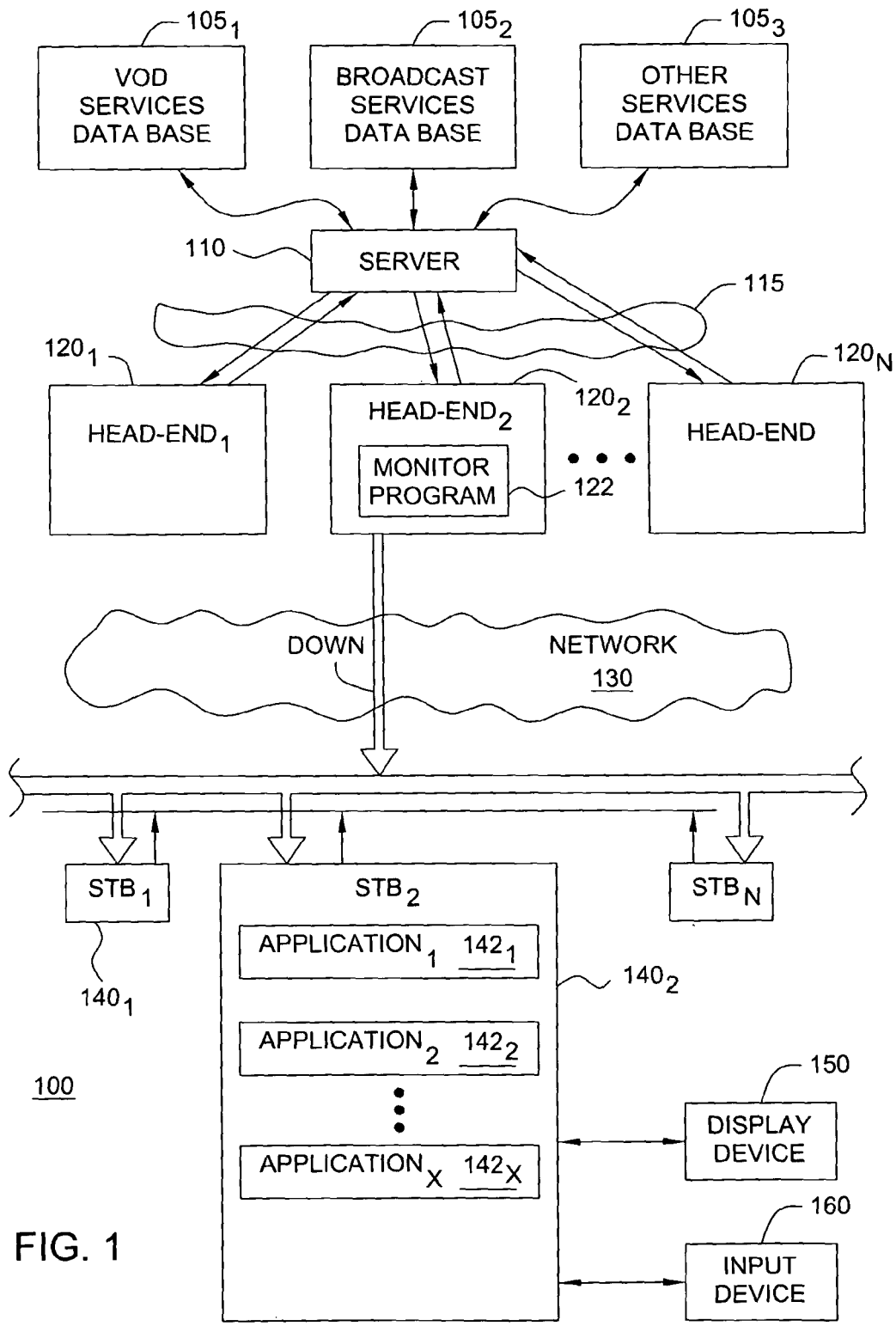
FIG. 1 depicts a high-level block diagram of an information distribution system suitable for use with the present invention.

FIG. 1 depicts a high level block diagram of an information distribution system suitable for use with the present invention. Specifically, the system 100 of FIG. 1 comprises a server 110, a provisioning network 115, a plurality of head-ends $120_1$ through $120_N$ (collectively head-ends 120), a network 130 and a plurality of set-top boxes STBs $140_1$ through $140_N$ (collectively set top STBs 140). The server 110 is associated with a plurality of databases 105, illustratively a video on demand (VOD) database $105_1$, a broadcast services database $105_2$ and other databases $105_3$. These databases 105 may be local (e.g., at a content aggregation point within or proximate the server) or remote (e.g., at a content provider point such as a studio or cable services source). Each STB is typically associated with a respective presentation device 150 such as a television or other video display device such as a television and a user input device 160 such as a remote control, pointing device and the like.

The server 110 is used to store and provide various assets such as audio-visual content, music, data, applications and the like to the head-ends 120. The server may be associated with individual or multiple content suppliers and/or application providers. The server 110 communicates with the various head-ends 120 via a provisioning network 115. The provisioning network may comprise any network topology supporting the conveyance of information to and from the server 110. Moreover, while depicted as separate components, the invention may be implemented within a system wherein the server 110 and head-end 120 are implemented within the same functional element. Generally speaking, the server 110 operates in part to provide information to, and receive information from, the STBs 140 via their respective head-ends 120 and network 130. The information propagated between the server 110 and STBs 140 is processed as appropriate by the head-end 120 and network 130.

Each of the head-ends 120 is associated with a neighborhood of STBs. For simplicity, only those STBs associated with the second head-end $120_2$ are shown and described herein. Each head-end 120 operates to communicate content and other data to its respective neighborhood of STBs by broadcast channels received by all STBs, narrowcast channels received by some of the STBs or point cast channels received by individual STBs. The head-ends 120 also interact with their STBs 140 to establish and tear down sessions with the STBs as necessary to enable the delivery of content, information services, applications, and the like. Generally speaking, the head-ends 120 operate to distribute content and other information provided by the server to the set-top boxes as appropriate, as well as return STB messages, billing information and other data to the server.

Each head-end 120 communicates with the STBs 140 within its neighborhood via a relatively high bandwidth forward or downstream communications channel DOWN and a relatively low bandwidth reverse or upstream communications UP. The downstream DOWN and upstream UP communications channels are supported by a network topology 130, such as a hybrid fiber-coax cable television distribution system, a satellite distribution system (e.g., using a telephone network or reverse satellite link for upstream communications) and the like. While not shown in FIG. 1, an out-of-band (OOB) forward communications channel may also be supported by the network topology 130. In such an implementation of the network topology 130, control messages and other information may be supplied to the STBs 140 via in-band messaging using the downstream communications channel DOWN or via out-of-band messaging using a forward communications channel (not shown).

The STBs 140 operate to receive broadcast (to most or all STBs), narrowcast (to a region or defined group of STBs) or pointcast (to one STB, also known as a unit singlecast) information from the head-ends 120 via the network 130 using the downstream communications channel DOWN (or out-of-band forward channel).

Second STB $140_2$ within the neighborhood associated with second head-end $120_2$ is depicted as including a plurality of application programs $142_1$-$142_x$ (application programs 142). The application programs 142 may comprise any of the applications used within the context of an STB 140, such as an interactive program guide (IPG) application, a VOD selection/billing application and the like.

Within the system 100 of FIG. 1, the clients or STBs 140 may comprise, illustratively, "heavy" set top boxes or "thin" set top boxes, where a heavy STB or client has significant computational and/or memory resources while a thin STB or client has constrained memory and/or computational resources. Rather than simply "heavy" or "thin" set top boxes, many more classes of set top boxes may be deployed. To simplify the discussion, it will be assumed that within the system 100 of FIG. 1, three classes of set top boxes are deployed.

Figure 2:
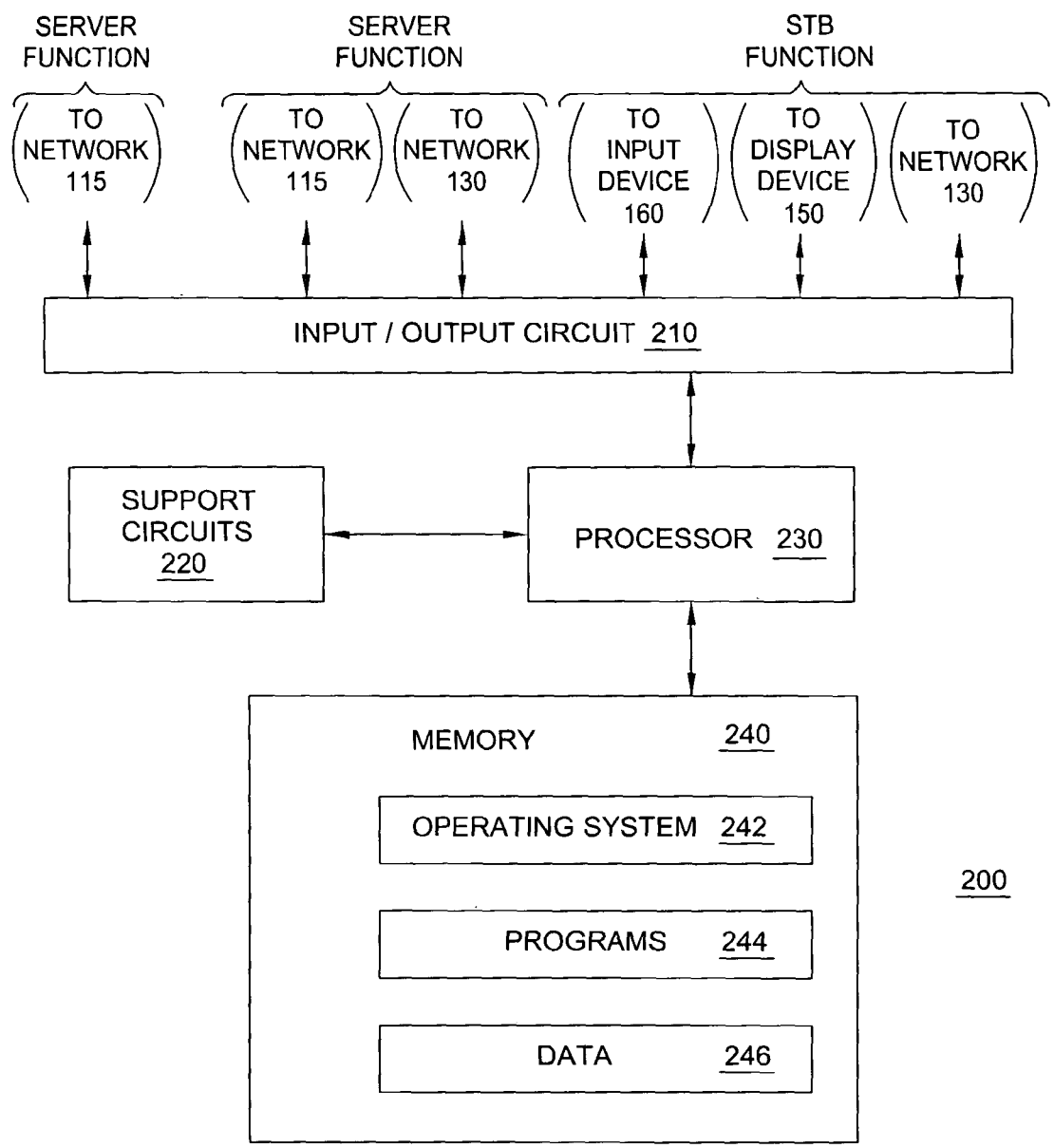
FIG. 2 depicts a high level block diagram of a controller topology suitable for use in the information distribution system of FIG. 1.

FIG. 2 depicts a high level block diagram of a controller topology suitable for use in the system 100 of FIG. 1. Specifically, the controller 200 of FIG. 2 may be employed to implement relevant functions within the server 110, head-end 120, and/or STB 140.

The controller 200 of FIG. 2 comprises a processor 230 as well as memory 240 for storing various control programs and other programs 244 and data 246. The memory 240 may also store an operating system 242 supporting the programs 244.

The processor 230 cooperates with conventional support circuitry such as power supplies, clock circuits, cache memory and the like as well as circuits that assist in executing the software routines stored in the memory 240. As such, it is contemplated that some of the steps discussed herein as software processes may be implemented within hardware, for example as circuitry that cooperates with the processor 230 to perform various steps. The controller 200 also contains input/output (I/O) circuitry 210 that forms an interface between the various functional elements communicating with the controller 200.

Although the controller 200 is depicted as a general purpose computer that is programmed to perform various control functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware or a combination thereof.

Topologies such as depicted with respect to the controller 200 of FIG. 2 may be advantageously employed within the context of the server 110, head-end 120, network 130 and/or STB 140. That is, by utilizing appropriate operating systems 242, programs 244 and/or data 246, the topology depicted with respect to controller 200 is used to realize the functional elements discussed herein with respect to the various figures. As noted in FIG. 2, the IO circuitry 210 communicates with network 115 as part of a server function, communicates with network 115 and network 130 as part of a head-end function, and communicates with input device 160, display device 150, and network 130 as part of an STB function.

The invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media or other signal bearing medium, and/or stored within a working memory within a computing device operating according to the instructions.

According to an embodiment of the present invention, basic data records or structures area adapted to include an "Extension Record," which refers back to an original, basic record and has specific data associated with it. For example, a basic event record (i.e., a basic record associated with an event such as a pay per view event) may be extended to include a promotional image or jacket art. This solution allows the addition of new data fields to an existing record without requiring changes to the middleware supporting an application or service. Instead, a new 'extension type' is defined on the server for all applicable set top box classes, and an application request the appropriate extension record for each applicable base record to access the new fields.

In order to allow low-powered set top boxes to provide as much data as possible, such as interactive program guide data, the data records themselves are minimized, and all set top boxes use the same records to conserve bandwidth (i.e., broadcasting multiple versions of the data for different boxes is wasteful). For this reason, we choose to 'extend' the basic data provided for each data record with optional 'data extension' records that can either be accepted or ignored by each set top box.

In one embodiment of the invention, for each type of data record provided by the Services Database (i.e. Event, Service, Event Details, Message, Application, etc.), a corresponding number of 'Extension types' are provided. Each record type/extension type pair on creation at the server is assigned one of four priorities (never store, low, high, or always store) for each of the three set top box classes (low-end, mid-range, high-end).

In one embodiment of the invention, for each specific record of a given type, if the record has data applicable to one of the extension records, the server formats that data as an extension record. The extension record is accessed by an applet or other client program, which client program has the ability to interpret and otherwise process the extra data. Thus, data structures suitable for use within the context of the present invention may be utilized by an application programming interface (API) within a middleware environment (e.g., on a set top box). For example, in one embodiment for Event Records, an Extension Type 1 contains an image. This is assigned a 'low' priority on all but high end boxes where, illustratively, the records are to be 'always' stored. In this case an applet, such as an applet implementing an interactive program guide, when displaying details for a given event may request the extension type 1 for the current event identifier and will be returned data which the applet then interprets as, illustratively, an image to display promotional artwork related to the event.

The invention provides several advantages, such as (1) additional data geared to high end boxes may be provided without encumbering low-end boxes with the data or duplicating basic information for the high-end boxes; (2) additional data fields can be added to the data schema without requiring changes to the middleware; and (3) a server UI component allows the addition of new extension record types dynamically so changes can be driven from third party applications; and (4) third party software developers to may extend existing listing (or other data) without needing changes to either the middleware or server (e.g., they can dynamically add new fields targeted to the set top boxes on which they want their application to run).

Figure 3:
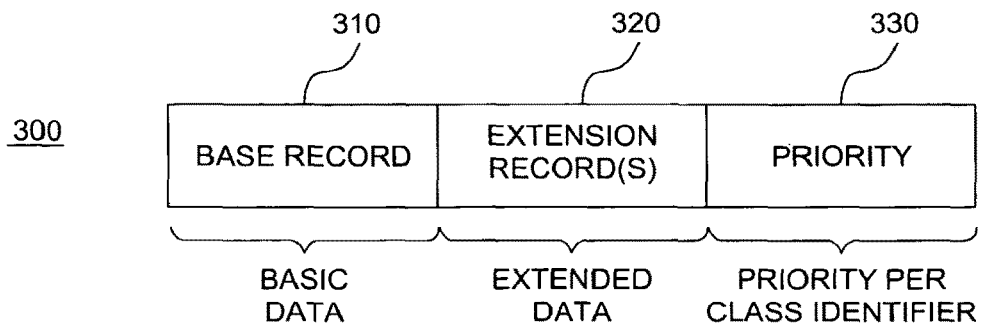
FIGS. 3, 4 and 5 depict flow diagrams of methods according to embodiments of the present invention.

FIG. 3 depicts a data structure suitable for use with the present invention. Specifically, FIG. 3 depicts a single data structure 300, illustratively a record within a database including a plurality of similarly structured records. The data structure 300 comprises a base record portion 310, an extension portion 320 and a priority portion 330.

The base record portion 310 comprises basic data from a data base associated with a service provider, such as a video on demand (VOD) provider, broadcast listing provider, application provider or other service provider. The basic data within the base record 310 comprises data that is to be used by every set top box within an information distribution system, regardless of class level (i.e., thin client, thick client and the like).

The extension portion(s) 320 is used to store extended data or a pointer, address or other indicator to the location of the extended data. The extended data may comprise still or moving imagery (e.g., promotional imagery and the like); content related information such as title, genre, actors and the like; as well as other data useful in implementing an advanced service or function within the client device. Generally speaking, extended data stored within (or pointed to by) the extension portion 320 of the data structure 300 comprises any data that may be used to supplement the service or application supported by the basic data within the base record portion 310.

The priority portion 330 includes priority per class identifier data. Specifically, use of the extended data is optionally divided into a plurality of priority levels, depending on the type of extended data provided. Some extended data may be crucial (such as billing information), while other extended data may be merely useful to provide. Additionally, the priority level of the extended data is optionally related to the capability or class of a set top box receiving the data structure 300.

For illustrative purposes, four priority levels are used; namely, Never Store (NS), low (L), high (H), and Always Store (AS). Extended data associated with a NS priority level is never stored by the set top box, while extended data associated with an AS priority level is always stored by the set top box. High priority data is preferentially stored before low priority data, and then only if memory remains after the storage of the always store data. The priority levels are used to provide guidance to the STB during the processing of extended data.

For illustrative purposes, the set top boxes are divided into three classes; namely, Low End (LE), Mid Range (MR), and High End (HE), set top boxes. A low end set top box may be considered to be a thin client set top box (i.e., severely constrained computational and/or memory resources). A high end set top box may be considered to be a thick client (i.e., ample computational and/or memory resources). A mid range set top box may be considered as having some constraints on memory and/or computational ability. The STB classes are used to differentiate between set top boxes based upon a capability level, such as a capability level identified according to processing and/or memory constraints.

It should be noted that a single base record 310 may be associated with multiple extension records 320, and that each of the multiple extension records may be associated with a different set of priorities. For example, an event record may have an image extension to be stored on heavy set top boxes only, and a third party data extension to be stored on all set top boxes (e.g., to enable access to a third party application by all set top boxes).

Generally speaking, the invention operates to provide services/functions at a level of functionality appropriate to each set top box. Basic services are nominally provided via the base record portion 310 of the data structure 300. Where additional processing and/or memory resources are available at the STB, enhanced services and/or functions are provided via the extension record portion 320 of the data structure 300. The suitability of extended data for use in a particular set top box is based on the importance of the extended data to an application or service (i.e., the priority), as well the ability of the set top box to process the extended data (i.e., the STB class). In this manner, basic application of functionality is delivered to each class of set top box, while those set top boxes capable of or benefiting from additional features are given the opportunity to utilize such features via extended data delivery within the extension portion 320 of the data structure 300.

Figure 4:
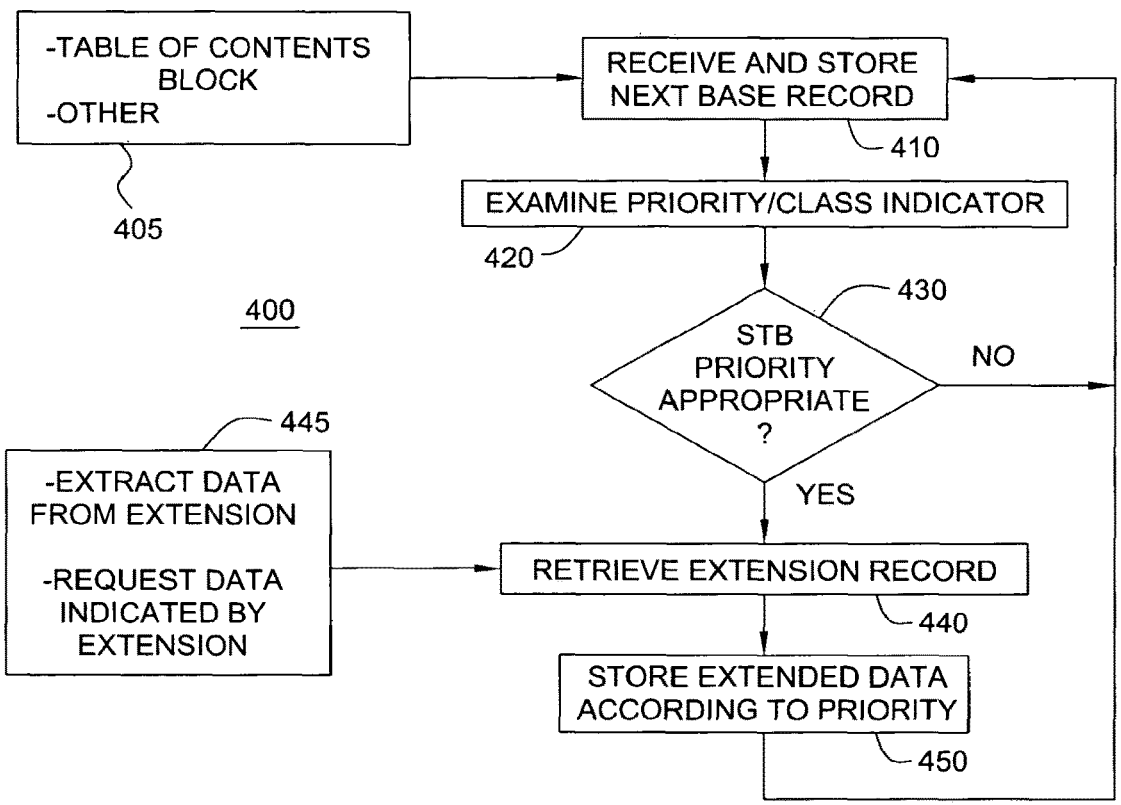

FIG. 4 depicts a high level block diagram of a data processing routine according to an embodiment of an invention. Specifically, the data processing routine 400 of FIG. 4 is adapted for use within a set top box processing a data stream including data structures such as those described above with respect to FIG. 3.

At step 410, a next base record is received and stored. Referring to box 405, the next base record is identified via a basic data record operating as a "table of contents" block which identifies all data blocks available including those for base records and extension records. Other means of identifying the next base record may also be used (e.g., a linked list approach).

At step 420, the priority/class indicator is examined to determine, at step 430, whether the extended data included within or referred to by the extension record is appropriate to the set top box. If the extended data is not appropriate, then the method 400 proceeds to step 410 to retrieve and store the next base record.

If the extended data is appropriate to the set top box, then at step 440 the extended data is retrieved and processed. Referring to box 445, the extension portion includes either the extended data or information to be utilized, or an address or other identification of the extended data or information to be utilized. That is, the contents of the extension portion 320 of the data structure may contain the specific information needed to invoke an advanced service or application function (e.g., a promotional file and the like), or an address or other indicator that is used merely to identify the specific information needed. If an address or indicator is provided, then at step 440 the STB propagates a signal back to the server to retrieve the specific information needed to invoke the advanced service or application function. The server processing of this request is discussed below with respect to FIG. 6.

At step 450, the extended data is stored according to the priority per class identifier. That is, extended data denoted as always store, high priority and/or low priority is stored as discussed above with respect to FIG. 3.

The routine of 400 of FIG. 4 is adapted to enabling a set top box to retrieve, process and optionally store extended data records that are associated with basic data or base records. This processing is performed in a prioritized manner and according to the capabilities of the set top box. Thus, the underlying structures utilized by a service or application may be the same for that application irrespective of the set top box within which that application is executed. The application only processes the extended data appropriate to its host set top box. In this manner, portability of applications, portability of data structures, and commonality of application services may be provided within the context of an information distribution system including set top boxes or clients having different capabilities.

Figure 5:
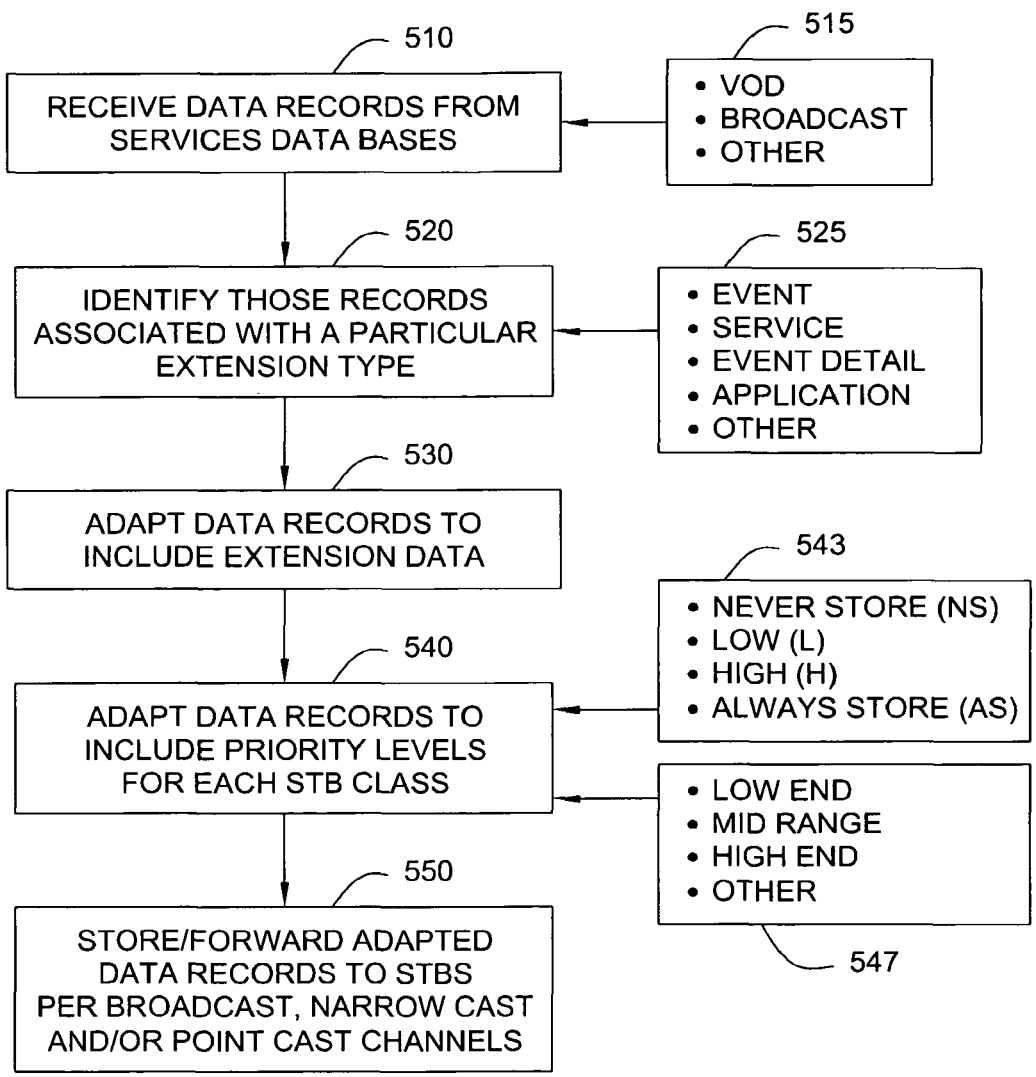

FIG. 5 depicts a flow diagram of a server-side method for processing data according to an embodiment of the invention. Specifically, FIG. 5 depicts a flow diagram of a data processing method 500 suitable for use in, for example, a server 110 or head-end 120 within the system 100 of FIG. 1. The method 500 of FIG. 5 is adapted to generating data structures useful in implementing various embodiments of the present invention.

At step 510, data records from a services data base are received. Referring to box 515, the services data base may comprise a video on demand (VOD) database, a broadcast listings database or some other application or services database.

At step 520, those records associated with a particular extension type are identified. Referring to box 525, the particular extension type may comprise an event type, a service type, an event detail, an application type or some other type. Numerous extension types may be defined.

At step 530, the received data records are adapted to include the extension data. That is, at step 530 the received data records are adapted to include a base record portion and an extension portion including a type identifier. Such adaptation may comprise, for example, the segmentation of application data into the basic data necessary to implement the application and extended data useful in providing enhanced application features or functions.

At step 540, the data records are adapted to include priority levels for each set top box class. Referring to box 543, the priority levels comprise, illustratively, a never store (NS), low (L), high (H), and always store (AS) priority level, as previously discussed. More or fewer priority levels may be utilized. Referring to box 547, the STB classes may comprise low end, mid range, high end, as previously discussed. More or fewer STB classes may be utilized.

At step 550, the adapted records are stored or forwarded to set top boxes per broadcast, narrowcast and/or point cast channels. That is, at step 550 the information provided by the modified data structure is propagated towards the set top boxes for subsequent processing and/or storage as appropriate to the service or application.

Figure 6:
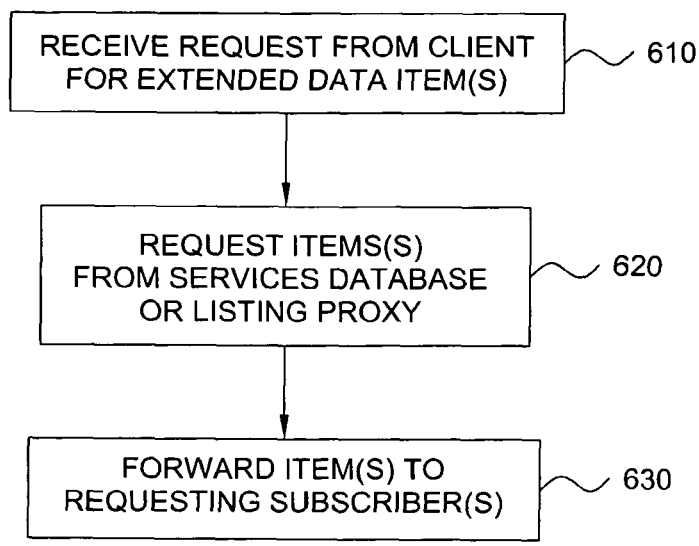
FIG. 6 depicts a flow diagram of a server-side method for processing a request according to an embodiment of the invention.

FIG. 6 depicts a flow diagram of a server-side method for processing a request according to an embodiment of the invention. Specifically, FIG. 6 depicts a flow diagram of a request processing method 600 suitable for use in, for example, a server 110 or head-end 120 within the system 100 of FIG. 1. The method 600 of FIG. 6 is adapted to responding to a STB request for information needed to invoke the advanced service or application function.

At step 610, a request for extended data item(s) is received from a client or, more specifically, a middleware API operating within the client to support an application or the application/applet itself.

At step 620, a request is propagated to the services database or listing proxy associated with the extended data item(s). For example, a listing proxy may comprise an application or functional entity that integrates content listings for both VOD and broadcast to provide an integrated listing. On those set top boxes where VOD operation is available, one application is the generation of such an integrated listing in a timely and accurate manner. Other services databases may be accessed to provide appropriate information in response to the STB request.

At step 630, the requested extended data item(s) are forwarded to the requesting STB or STBs.

The above methods may be used independently or in any combination. More specifically, various functional elements within the system 100 of FIG. 1 may be used to perform all or only a portion of the processing tasks described with respect to the various Figures. For example, using the method 600 of FIG. 6, the proxy servers may be used to create merged VOD/broadcast listing IPG data. The data may be further processed by the server (e.g., per the method 500 of FIG. 5) to provide additional IPG application data.

While the foregoing is directed to certain embodiments of the present invention, these embodiments are meant to be illustrative, not limiting. Other and further embodiments of the invention may be devised without departing from the basic scope thereof, which is to be determined by the following claims.

What is claimed is:

1. A method comprising:
  receiving, by a client device and from a server, a data record comprising:
    a first portion that comprises service data for providing a service,
    a plurality of second portions, wherein each of the plurality of second portions comprises extended service data, and wherein, for each of the plurality of second portions, the extended service data is associated with an enhancement to the service and is associated with a subset of device classes of a plurality of device classes, and a plurality of third portions, wherein each of the plurality of third portions is associated with a respective second portion of the plurality of second portions, wherein each of the plurality of third portions comprises a plurality of indicators, and wherein, for each of the plurality of third portions, the plurality of indicators indicate, based on an indicator for each of the plurality of device classes, which subset of the plurality of device classes is to process the extended service data of the respective second portion;

determining, based on the plurality of indicators of at least one of the plurality of third portions, that the client device is to process the extended service data of at least one of the plurality of second portions;

processing the extended service data of the at least one of the plurality of second portions; and providing, by the client device, based on the extended service data of the at least one of the plurality of second portions and based on the service data, the service.

2. The method of claim 1, wherein, for each of the plurality of second portions, the extended service data comprises a pointer or address to a location storing content data associated with the subset of device classes.

3. The method of claim 1, wherein, for each of the third portions, the plurality of indicators comprises a first indicator, corresponding to a first class of device of the plurality of device classes, that indicates the first class of device is not to process the extended service data of the respective second portion; and wherein, for each of the third portions, the plurality of indicators comprises a second indicator, corresponding to a second class of device of the plurality of device classes, that indicates the second class of device is to process the extended service data of the respective second portion.

4. The method of claim 3, wherein the client device is associated with the second class of device.

5. The method of claim 3, wherein the first class of device comprises one of: a low-end class, a mid-range class or a high-end class.

6. The method of claim 5, wherein the first indicator indicates that the first class of device is to never store the extended service data of the respective second portion, and wherein the second indicator indicates that the second class of device is to always store the extended service data of the respective second portion.

7. The method of claim 3, wherein, for each of the third portions, the plurality of indicators comprises a third indicator, corresponding to a third class of device of the plurality of device classes, that indicates whether the third class of device is to process the extended service data of the respective second portion.

8. The method of claim 1, wherein the service data comprises video on-demand content, wherein the service comprises a video-on-demand service, and wherein the data record is configured to be stored in a video-on-demand database.

9. The method of claim 1, wherein the extended service data of the at least one of the plurality of second portions comprises image content data.

10. The method of claim 1, wherein the service data comprises video-on-demand data or content listing data, and wherein the extended service data, of at least one of the second portions, comprises image data or data indicating information for a content item.

11. A method comprising:
configuring, by a first computing device, a data record to comprise:
a first portion that comprises service data for providing a service,
a plurality of second portions that each comprises extended service data, wherein for each of the plurality of second portions, the extended service data is associated with an enhancement to the service and is associated with a subset of device classes of a plurality of device classes, and
a plurality of third portions, wherein each of the plurality of third portions is associated with a respective second portion of the plurality of second portions, wherein each of the plurality of third portions comprises a plurality of indicators, and wherein, for each of the plurality of third portions, the plurality of indicators indicate, based on an indicator for each of the plurality of device classes, which subset of the plurality of device classes is to process the extended service data of the respective second portion; and causing transmission, to a second computing device, of the data record.

12. The method of claim 11, wherein, for each of the plurality of second portions, the extended service data comprises a pointer or address to a location storing content data associated with the subset of device classes.

13. The method of claim 11, wherein, for each of the third portions, the plurality of indicators comprises a first indicator, corresponding to a first class of device of the plurality of device classes, that indicates the first class of device is not to process the extended service data of the respective second portion; and wherein, for each of the third portions, the plurality of indicators comprises a second indicator, corresponding to a second class of device of the plurality of device classes, that indicates the second class of device is to process the extended service data of the respective second portion.

14. The method of claim 13, wherein the first class of device comprises one of: a low-end class, a mid-range class or a high-end class.

15. The method of claim 14, wherein the first indicator indicates that the first class of device is to never store the extended service data of the respective second portion, and wherein the second indicator indicates that the second class of device is to always store the extended service data of the respective second portion.

16. The method of claim 13, wherein, for each of the third portions, the plurality of indicators comprises a third indicator, corresponding to a third class of device of the plurality of device classes, that indicates whether the third class of device is to process the extended service data of the respective second portion.

17. The method of claim 11, wherein the service data comprises video on-demand content, wherein the service comprises a video-on-demand service, wherein the extended service data of at least one of the plurality of second portions comprises image content data, and wherein the data record is configured to be stored in a video-on-demand database.

18. The method of claim 11, further comprising:
retrieving, before the configuring and from a first content listing database associated with the first computing device, the data record; and wherein, after the configuring, the data record is configured to be stored in a second content listing database associated with the second computing device.

19. The method of claim 11, wherein the service data comprises video-on-demand data or content listing data, and wherein the extended service data, of at least one of the second portions, comprises image data or data indicating information for a content item.

20. A method comprising:
    transmitting, by a first computing device and to a second computing device, a data record comprising:
        a first portion that comprises service data for providing a service,
        a plurality of second portions that each comprises extended service data, wherein, for each of the plurality of second portions, the extended service data is associated with an enhancement to the service and is associated with a subset of device classes of a plurality of device classes, and
        a plurality of third portions, wherein each of the plurality of third portions is associated with a respective second portion of the plurality of second portions, wherein each of the plurality of third portions comprises a plurality of indicators, and wherein, for each of the plurality of third portions, the plurality of indicators indicate, based on an indicator for each of the plurality of device classes, which subset of the plurality of device classes is to process the extended service data of the respective second portion.

21. The method of claim 20, wherein, for each of the third portions, the plurality of indicators comprises a first indicator, corresponding to a first class of device of the plurality of device classes, that indicates the first class of device is not to process the extended service data of the respective second portion; and
    wherein, for each of the third portions, the plurality of indicators comprises a second indicator, corresponding to a second class of device of the plurality of device classes, that indicates the second class of device is to process the extended service data of the respective second portion; and
    wherein the second computing device is associated with the first class of device.

22. The method of claim 21, wherein, for each of the third portions, the plurality of indicators comprises a third indicator, corresponding to a third class of device of the plurality of device classes, that indicates whether the third class of device is to process the extended service data of the respective second portion.

23. The method of claim 20, wherein the service data comprises video-on-demand data or content listing data, and wherein the extended service data, of at least one of the second portions, comprises image data or data indicating information for a content item.

\* \* \* \* \*

UNITED STATES PATENT AND TRADEMARK OFFICE
CERTIFICATE OF CORRECTION

| | | |
|---|---|---|
| PATENT NO. | : 10,506,263 B2 | Page 1 of 1 |
| APPLICATION NO. | : 14/325464 | |
| DATED | : December 10, 2019 | |
| INVENTOR(S) | : Hindle et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 688 days.

Signed and Sealed this
Seventh Day of February, 2023

Katherine Kelly Vidal
*Director of the United States Patent and Trademark Office*